(12) United States Patent
Yang

(10) Patent No.: US 11,567,699 B2
(45) Date of Patent: Jan. 31, 2023

(54) MEMORY CONTROLLER HAVING A PLURALITY OF CONTROL MODULES AND ASSOCIATED SERVER

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 98 days.

(21) Appl. No.: 17/168,153

(22) Filed: Feb. 4, 2021

(65) Prior Publication Data

US 2022/0244888 A1 Aug. 4, 2022

(51) Int. Cl.
*G06F 3/06* (2006.01)
*G06F 12/1081* (2016.01)
*G06F 12/02* (2006.01)

(52) U.S. Cl.
CPC .......... *G06F 3/0659* (2013.01); *G06F 3/0613* (2013.01); *G06F 3/0679* (2013.01); *G06F 12/0246* (2013.01); *G06F 12/1081* (2013.01)

(58) Field of Classification Search
CPC .... G06F 3/0613; G06F 3/0659; G06F 3/0679; G06F 12/0246; G06F 12/1081; Y02D 10/00
See application file for complete search history.

(56) References Cited

U.S. PATENT DOCUMENTS

| 10,445,229 | B1 | 10/2019 | Kuzmin | |
|---|---|---|---|---|
| 2014/0082260 | A1* | 3/2014 | Oh | G06F 12/0246 711/103 |
| 2016/0077911 | A1 | 3/2016 | Malshe | |
| 2017/0228167 | A1 | 8/2017 | Manohar | |
| 2018/0232157 | A1* | 8/2018 | Seo | G06F 3/0688 |
| 2019/0065086 | A1* | 2/2019 | Margetts | G06F 3/0659 |
| 2019/0286338 | A1* | 9/2019 | Noda | G06F 3/0659 |
| 2021/0182190 | A1* | 6/2021 | Gao | G06F 12/0246 |

FOREIGN PATENT DOCUMENTS

| CN | 101398745 A | 4/2009 |
|---|---|---|
| TW | 201101327 A1 | 1/2011 |
| TW | I376603 | 11/2012 |

* cited by examiner

*Primary Examiner* — Larry T Mackall
(74) *Attorney, Agent, or Firm* — Winston Hsu

(57) ABSTRACT

The present invention provides a memory controller configured to access a plurality of channels, wherein each of the channels includes a plurality flash memory chips, and the memory controller includes a flash translation layer and a plurality of control modules. The flash translation layer is configured to generate commands with corresponding physical addresses of at least one of the channels. The plurality of control modules are connected to the plurality of channels, respectively, and each of the control modules operates independently to receive the corresponding command with the corresponding physical address from the flash translation layer, to access the flash memory chips within the corresponding channels.

12 Claims, 4 Drawing Sheets

MEMORY CONTROLLER HAVING A PLURALITY OF CONTROL MODULES AND ASSOCIATED SERVER

BACKGROUND OF THE INVENTION

1. Field of the Invention

The present invention is related to memory control, and more particularly, to a control method and a control circuit for an all flash array (AFA) server.

2. Description of the Prior Art

Flash memories have been widely applied to various data storage device such as solid state drives (SSDs), and a server named AFA server may contain only the SSDs instead of spinning-disk drives. In the AFA server, each SSD contains multiple flash memory chips, and each flash memory chip needs a fixed busy time during a read/write operation, that is, the flash memory chip cannot perform another read or write operation during the busy time. Therefore, if the AFA server needs to perform a large number of read/write operations on the SSD in a short time, the read/write operations will be delayed due to the influence of the above-mentioned busy time. In addition, with the update of Peripheral Component Interconnect Express (PCIe) version, the demand for transfer rate from the host device is also getting higher, and the number of read/write commands from the host device may also increase significantly. Therefore, how to efficiently access the SSD is an important topic.

SUMMARY OF THE INVENTION

It is therefore an objective of the present invention to provide a new architecture of a memory controller within the AFA server, to solve the above-mentioned problems.

According to one embodiment of the present invention, a memory controller configured to access a plurality of channels is disclosed, wherein each of the channels comprises a plurality flash memory chips, and the memory controller comprises a flash translation layer and a plurality of control modules. The flash translation layer is configured to generate commands with corresponding physical addresses of at least one of the channels. The plurality of control modules are connected to the plurality of channels, respectively, and each of the control modules operates independently to receive the corresponding command with the corresponding physical address from the flash translation layer, to access the flash memory chips within the corresponding channels. In addition, each of the control modules comprises a plurality of command queues and an arbiter and DMA engine. The plurality of command queues correspond to the plurality flash memory chips, respectively, and each of the command queues only stores the command having the physical address of the corresponding flash memory chip. The arbiter and DMA engine is coupled to the plurality of command queues, and is configured to scan the plurality of flash memory chips to determine states of the flash memory chips, for determining if executing the commands stored in the command queues.

According to another embodiment of the present invention, a server comprising a network module, a processor, a plurality of channels and a memory controller is disclosed. The network module is configured to connect client device (s) via network. The processor is configured to control operations of the server. Each of the channels comprises a plurality flash memory chips. The memory controller is coupled between the processor and the plurality of channels, and the memory controller comprises a flash translation layer and a plurality of control modules. The flash translation layer is configured to generate commands with corresponding physical addresses of at least one of the channels. The plurality of control modules are connected to the plurality of channels, respectively, and each of the control modules operates independently to receive the corresponding command with the corresponding physical address from the flash translation layer, to access the flash memory chips within the corresponding channels. In addition, each of the control modules comprises a plurality of command queues and an arbiter and DMA engine. The plurality of command queues correspond to the plurality flash memory chips, respectively, and each of the command queues only stores the command having the physical address of the corresponding flash memory chip. The arbiter and DMA engine is coupled to the plurality of command queues, and is configured to scan the plurality of flash memory chips to determine states of the flash memory chips, for determining if executing the commands stored in the command queues.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
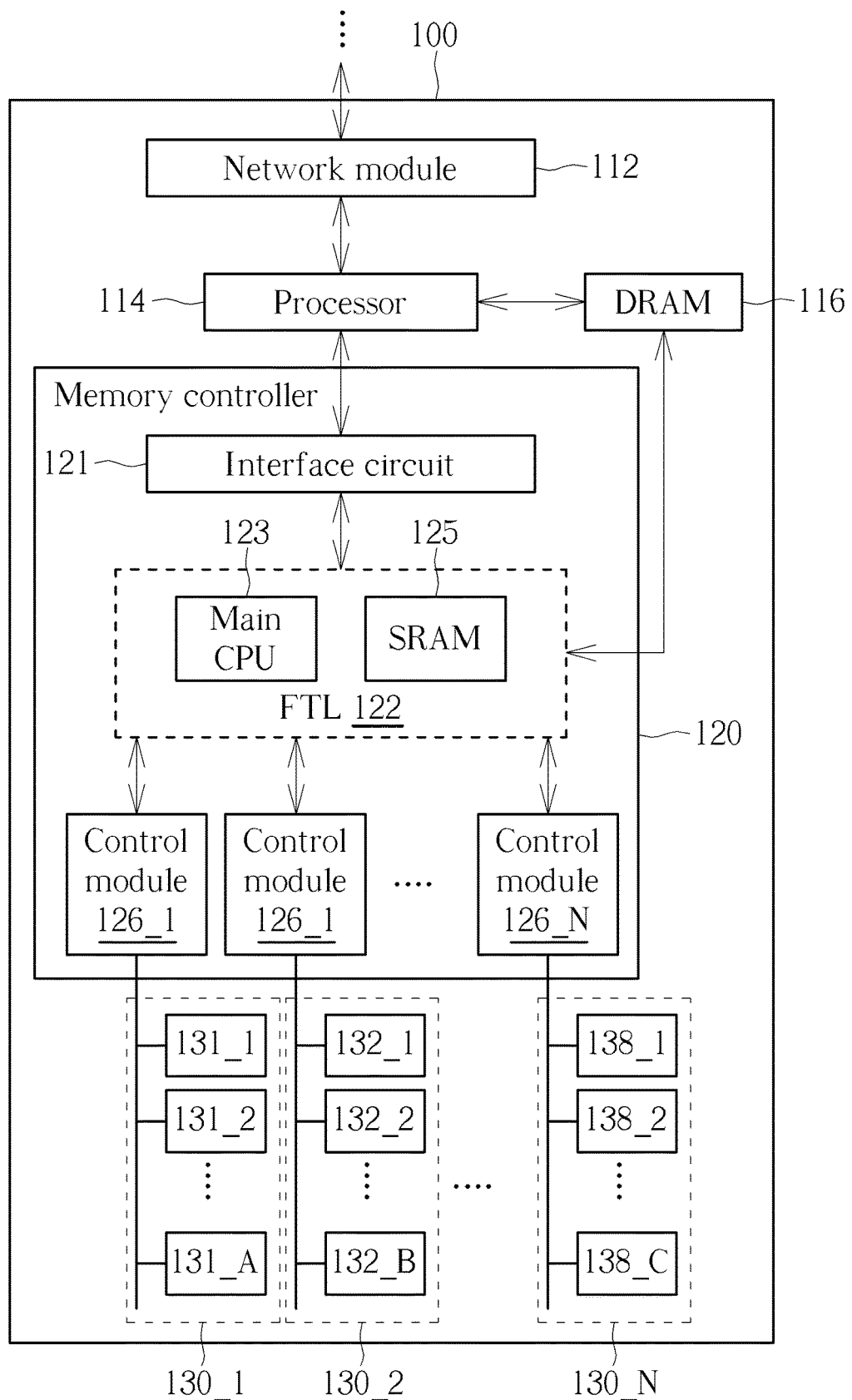
FIG. 1 is a diagram illustrating a server according to one embodiment of the present invention.

FIG. 1 is a diagram illustrating a server 100 according to one embodiment of the present invention, wherein the server 100 is an AFA server. As shown in FIG. 1, the server 100 comprises a network module 112, a processor 114, a dynamic random access memory (DRAM) 116, memory controller 120 and a plurality of channels 130_1-130_N, where 'N' may be any positive integer equal to or greater than two. The memory controller 120 comprises an interface circuit 121, a flash translation layer (FTL) 122 and a plurality of control modules 126_1-126_N, wherein the FTL 122 comprises a main central processing unit (CPU) 123 and a static random access memory (SRAM) 125. The channels 130_1-130_N are connected to the control modules 126_1-126_N, respectively, and each channel comprises a plurality of flash memory chips. For example, the channel 130_1 comprises the flash memory chips 131_1-131_A, the channel 130_2 comprises the flash memory chips 132_1-132_B, the channel 130_N comprises the flash memory chips 138_1-138_C. In addition, each of the channels 130_1-130_N may be regarded as a pluggable solid state drive (SSD).

Figure 2:
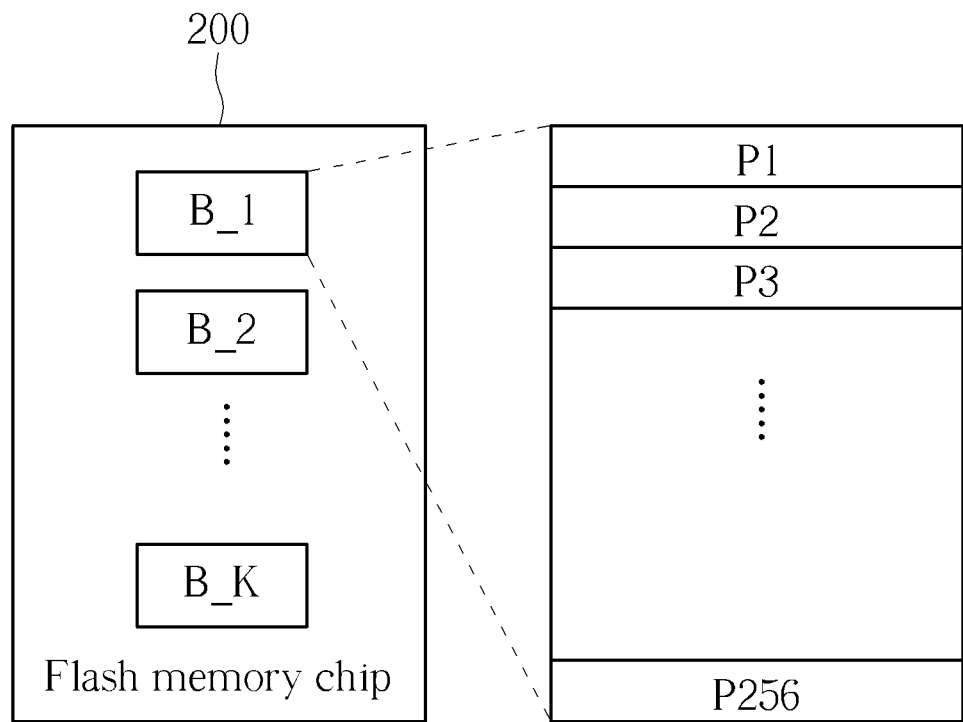
FIG. 2 shows a flash memory chip according to one embodiment of the present invention.

FIG. 2 shows a flash memory chip 200 according to one embodiment of the present invention, wherein the flash memory chip 200 may be used to implement each one of the flash memory chips 131_1-131_A, 132_1-132_B and 138_1-138_C. As shown in FIG. 2, the flash memory chip 200 comprises a plurality of blocks B_1-B_K, wherein one block is a minimum erase unit of the flash memory chip 200, and each of the blocks B_1-B_K may have a single-level cell (SLC) array, a multi-level cell (MLC) array, a triple-level cell (TLC) array or a quad-level cell (QLC) array. Each block comprises a plurality of pages such as P1-P256, wherein one page is a minimum write unit of the flash memory chip 200. In addition, the blocks B_1-B_K within the flash memory chip 200 may be divided into several planes for the parallel operations.

The server 100 is configured to connect to at least one client device via Internet or Ethernet, and the network module 112 serves as an interface to receive data from the client devices and transmit data to the client devices. The processor 114 is configured to control the operations of the server 100. For example, when the processor 114 receives a read command from the client device, the processor 114 refers to a logical address within the read command to send a request to the memory controller 120 to ask for the data corresponding to the logical address of the read command, and the processor 114 sends the data read from at least one of the channels 130_1-130_N to the client device. In addition, when the processor 114 receives a write command and corresponding data from the client device, the data may be temporarily stored in the DRAM 116, and the processor 114 may perform compression and/or de-duplication operation on the data, then the processor 114 stores the data into at least one of the channels 130_1-130_N via the memory controller 120.

The memory controller 120 may be implemented by a single chip configured to perform the operations between the processor 114 of the server 100 and the channels 130_1-130_N. Regarding the elements within the memory controller 120, the interface circuit 121 is connected to the processor 114, and the interface circuit 121 may comply with Non-Volatile Memory Express (NVMe) specification and Peripheral Component Interconnect Express (PCIe) specification. The FTL 122 is configured to execute the operations such as basic mapping schemes, garbage collection, wear-leveling mechanism, block managements, and any other operation related to the managements of the channels 130_1-130_N. Specifically, logical address to physical address mapping tables (hereinafter, L2P tables) and/or physical address to logical address mapping tables (hereinafter, P2L table) are stored in the SRAM 125 or the DRAM 116, and the main CPU 123 can refer to the L2P tables or the P2L tables to perform the mapping schemes on the logical address within the read command to obtain the physical address of the channels 130_1-130_N, for getting the data from the 130_1-130_N. The SRAM 125 or the DRAM 116 may further store the health-related information for the garbage collection, the wear-leveling mechanism and/or the block managements, wherein the health-related information may comprise a read-count table recoding the read counts of each block, an erase-count table recording the erase counts of each block, a valid page table recording a number of valid pages within each block, a data retention table recording a write time of each block.

As described in the background of the present invention, with the update of PCIe version, the demand for transfer rate from the host device is also getting higher, and the number of read/write commands from the host device may also increase significantly. Therefore, the memory controller 120 designs multiple control modules 126_1-126_N respectively corresponding to the channels 130_1-130_N, and this internal parallelism makes the memory controller 120 capable of handling multiple incoming read/write commands in parallel and achieving a high bandwidth. Specifically, the main CPU 123 may have an arbiter that is configured to send the read/write commands and the related physical addresses of the channels to the control modules 126_1-126_N, and each of the control modules 126_1-126_N works independently and sends the response to the main CPU 123. For example, when the main CPU sends a first read command and a second read command to the control module 126_1 and the control module 126_2, respectively, the control module 126_1 refers to the physical address of the first read command to get the data from the channel 130_1 and send the data to the main CPU 123, and the control module 126_2 refers to the physical address of the second read command to get the data from the channel 130_2 and send the data to the main CPU 123. It is noted that the physical address that the control module 126_1-126_N receives indicate a chip number, a block number and a page number of the channel, that is the control module 126_1-126_N does not need to perform any address mapping mechanism.

Figure 3:
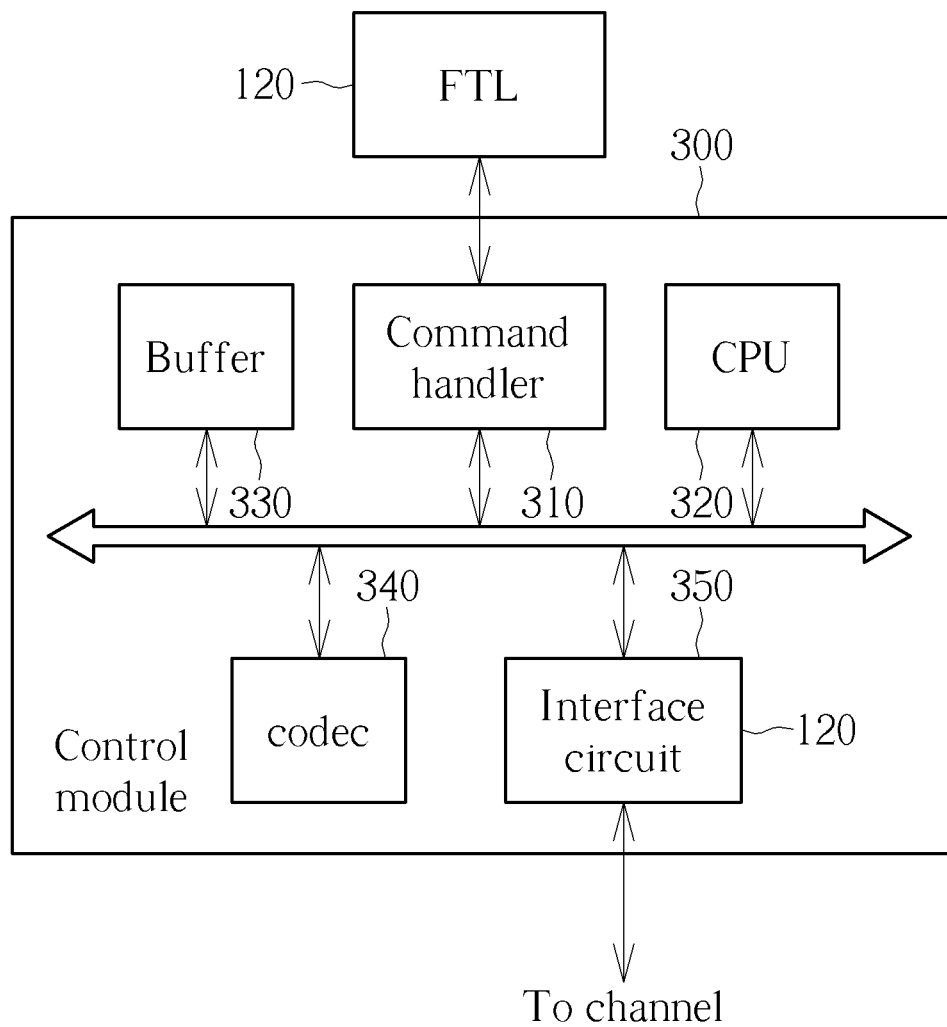
FIG. 3 shows a control module according to one embodiment of the present invention.

FIG. 3 shows a control module 300 according to one embodiment of the present invention, wherein the control module 300 can be used to implement each of the control modules 126_1-126_N shown in FIG. 1. As shown in FIG. 3, the control module 300 comprises a command handler 310, a CPU 320, a buffer 330, a codec 340 comprising an encoder and a decoder, and an interface circuit 350. The command handler 310 is configured to receive the commands from the FTL 122 and notifies the CPU 320 to perform the corresponding operations. Specifically, if the command handler 310 receives a read command with a corresponding physical address from the FTL 122, the CPU 320 may control the interface circuit 350 to ask for the data stored in the physical address of at least one of the channels 130_1-130_N; and after the interface circuit 350 gets the raw data from the at least one of the channels 130_1-130_N, the codec 340 decodes the raw data to generate decoded data, and the CPU 320 sends the decoded data to the FTL 120 via the command handler 310. If the command handler 310 receives a write command with a corresponding physical address and corresponding data from the FTL 122, the codec 340 encodes the data to generate encoded data, the CPU 320 may control the interface circuit 350 to write the encoded data into the physical address of at least one of the channels 130_1-130_N; and after the encoded data is successfully written into the at least one of the channels 130_1-130_N, the CPU 320 or the command handler 310 notifies the FTL 120 that the write command has been completed. If the command handler 310 receives an erase command with a corresponding physical block address (e.g., chip number and block number) from the FTL 122, the CPU 320 may control the interface circuit 350 to notify at least one of the channels 130_1-130_N to erase the block having the physical block address; and after the block is successfully erased, the CPU 320 or the command handler 310 notifies the FTL 120 that the erase command has been completed.

In one embodiment, the main CPU 123 of the FTL 122 is configured to perform event-driven operations, and the CPU 320 within the control module 300 is configured to perform timing-driven operations. In detail, because the FTL 122 has many tables related to the health of the blocks, such as the read-count table, the erase-count table, the valid page table and the data retention table, the main CPU 123 can refer to these tables to determine specific blocks that may have quality issue. For example, the main CPU 123 may determine that the block whose read count is higher than a threshold value may suffer a read disturbance issue, the main CPU 123 may determine that the block with valid pages lower than a threshold value should be performed the garbage collection operation, the main CPU 123 may determine that the block whose write time is earlier than a specific date may suffer a data retention issue; then the main CPU 123 may perform the garbage collection operation or a wear-level operation on these blocks to improve the data quality. In addition, the main CPU 123 can execute the garbage collection operation or the wear-level operation by sending the read commands (garbage collection read commands) and write commands (garbage collection write commands) to at least one of the control modules 126_1-126_N, and the control modules 126_1-126_N executes the read/write commands.

The control module 300 may periodically scan the blocks within the corresponding channels to determine if any block has a quality issue, wherein the period may be several minutes or any other appropriate time. In detail, the control module 300 may read some pages within a block to determine if the block has poor quality, wherein the codec 340 may decode the data read from the pages to obtain the decoding information such as error bit count or decoding time, and the CPU 320 can determine that the block has poor quality if the error bit count is higher than a threshold or the decoding time is longer than predetermined time. In addition, after the control module 300 determines the health information by periodically scanning the blocks, the CPU 320 may actively process these blocks with worse quality, or the CPU 320 may send the health information to the FTL 120. Specifically, if the control module 300 determines that three blocks of the corresponding channels have worse quality, the CPU 320 may actively move the data of these three blocks to blank blocks, respectively, without notifying the FTL 122; and after the data is successfully moved, the CPU 320 establishes the address mapping table of data within the old blocks (i.e. the above three blocks with worse quality) and the new blocks (i.e. the above blank blocks for storing data from the old blocks), and the address mapping table is sent to the FTL 120 for updating the P2L table or the L2P table stored in the SRAM 125 or the DRAM 116; and only when the main CPU 123 successfully updates the P2L table or the L2P table by using the address mapping table generated by the control module 300, the old blocks are allowed to be erased. In another example, if the control module 300 determines that three blocks of the corresponding channels have worse quality, the CPU 320 may directly send the health information to the FTL 122, for the main CPU 123 to establish a table recording the blocks having the worse quality; and the main CPU 123 can prioritize garbage collection operation on these blocks.

In light of above, by designing multiple control modules 126_1-126_N within the memory controller 120 to handle the access of the channels 130_1-130_N, respectively, the memory controller 120 can efficiently handle a large number of read/write commands. In addition, by configuring the main CPU 123 to execute the event-driven operations and configuring the control modules 126_1-126_N to execute the timing-driven operations, the main CPU 123 can be more efficient in execution and simpler in design.

Figure 4:
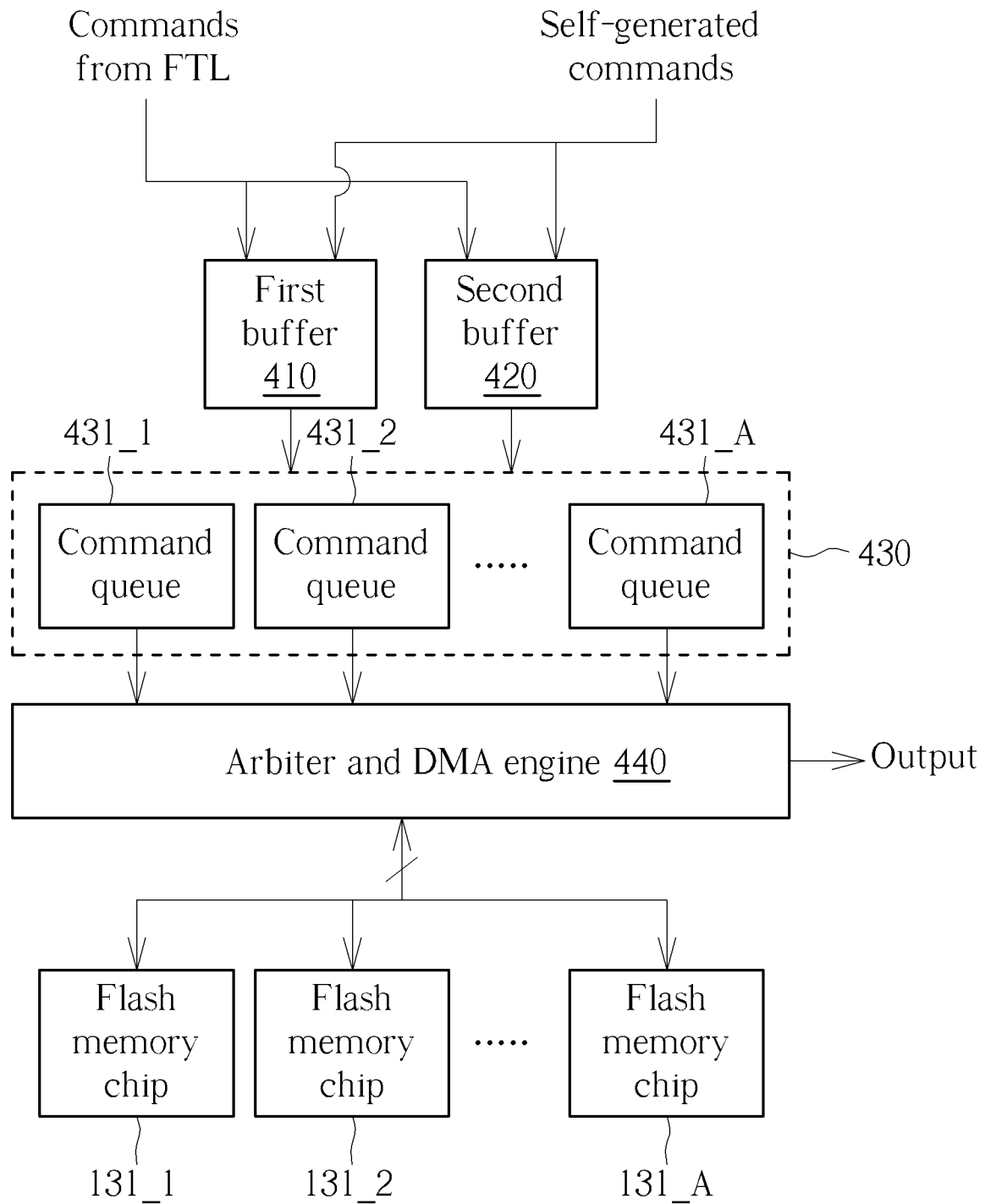
FIG. 4 shows the configuration of the buffer and the queue within one of the control modules according to one embodiment of the present invention.

In addition, each of the control modules 126_1-126_N may receive many commands from the host (i.e. the processor 114 of the server 100) within a short time, thus causing congestion in the internal buffer. Therefore, the present invention further provides another embodiment shown in FIG. 4 to overcome the command congestion issue. FIG. 4 shows the configuration of the buffer and the queue within one of the control modules 126_1-126_N according to one embodiment of the present invention, wherein the control modules 126_1 having the structure shown in FIG. 3 is used as an example. As shown in FIG. 4, the control module 126_1 comprises a first buffer 410, a second buffer 420, a buffer 430 comprising a plurality of command queues 431_1-431_A, an arbiter and DMA (direct memory access) engine 440, wherein the arbiter and DMA engine 440 is coupled to the flash memory chips 131_1-131_A. In this embodiment, the first buffer 410 and the second buffer 420 may be within the command handler 310 or the buffer 330 shown in FIG. 3, the command queues 430_1-431_A and the arbiter and DMA engine 440 may be within the interface circuit 350.

The first buffer 410 and the second buffer 420 are configured to receive the commands from the FTL 122 and the self-generated commands (e.g. the read/write commands generated by the CPU 320 to perform timing-driven operations). In one embodiment, the first buffer 410 is configured to store write commands, and the second buffer 420 is configured to store read commands. In another embodiment, the first buffer 410 is configured to store the commands with higher priority, and the second buffer 420 is configured to store the commands with lower priority, wherein the commands with higher priority may comprise read commands from the host (e.g., the read commands from the processor 114), and the commands with lower priority may comprise write commands from the host, write commands generated by the FTL 122 (e.g., write commands related to the garbage collection operation), read commands generated by the FTL 122 (e.g., read commands related to the garbage collection operation) and/or self-generated commands (e.g. the read/write commands generated by the CPU 320 to perform the timing-driven operation).

The command queues 431_1-431_A correspond to planes of the channel 130_1, respectively. In this embodiment, it is assumed that each of the flash memory chips 131_1-131_A has only one plane, so the command queues 431_1-431_A correspond to the flash memory chips 131_1-131_A, respectively, that is the command queue 430_1 only stores the commands having the physical address of the flash memory chip 131_1y, the command queue 430_2 only stores the commands having the physical address of the flash memory chip 131_2, . . . , and the command queue 430_A only stores the commands having the physical address of the flash memory chip 131_A. Therefore, the command handler 310 or the CPU 320 refers to the physical address of the commands within the first buffer 410 and the second buffer 420 to send the commands to the corresponding command queue. For example, if the first buffer 410 has a write command having the physical address of the flash memory chip 131_2, the command handler 310 or the CPU 320 will move this write command to the command queue 131_2;

and if the first buffer 420 has a read command having the physical address of the flash memory chip 131_A, the command handler 310 or the CPU 320 will move this read command to the command queue 131_A.

In one embodiment, the command handler 310 or the CPU 320 may determine the order of storing commands into the command queue according to the configuration of the first buffer 410 and the second buffer 420. For example, if the first buffer 410 is configured to store the commands with higher priority and the second buffer 420 is configured to store the commands with lower priority, the command handler 310 or the CPU 320 may preferentially move the commands within the first buffer 410 to the command queues 431_1-431_A, even if the second buffer 410 has more commands or the commands stay in the second buffer 420 are longer than the commands stays in the first buffer 410.

The arbiter and DMA engine 440 is configured to always scan the flash memory chips 131_1-131_A to determine the states of the flash memory chips 131_1-131_A, and once the arbiter and DMA engine 440 determines that one flash memory chip is not busy and capable of being accessed, the arbiter and DMA engine 440 immediately executes the command within the corresponding command queue. Specifically, every time when the flash memory chip receives a command, the flash memory chip needs a busy time to execute the command, wherein the busy time may be a fixed period such as 60 micro-seconds or 80 micro-seconds for the read command, or the busy time may be another fixed period for the write command. Therefore, the arbiter and DMA engine 440 periodically scans the flash memory chips 131_1-131_A (e.g. round-robin scan) to determine which flash memory chip is able to be accessed, wherein the arbiter and DMA engine 440 may detect a pin of each flash memory chip, and this pin has a signal that is capable of indicating if the flash memory chip is busy. For example, if the arbiter and DMA engine 440 detects that the flash memory chip 131_1 is busy, the arbiter and DMA engine 440 immediately detects the next flash memory chip 131_2; and if the arbiter and DMA engine 440 detects that the flash memory chip 131_2 is not busy, the arbiter and DMA engine 440 executes the command within the command queue 431_2 to access the flash memory chip 131_2, wherein the arbiter and DMA engine 440 may directly writes data into the flash memory chip 131_2 if the write command is executed, and the arbiter and DMA engine 440 reads data from the flash memory chip 131_2 if the read command is executed; then, the arbiter and DMA engine 440 detects if next flash memory chip is busy, without considering the processing of the flash memory chip 131_2.

In light of above, because each of the command queues 431_1-431_A within the control module 126_1/300 corresponds to a dedicated flash memory chip or a dedicated plane within one flash memory chip, the arbiter and DMA engine 440 can use this internal parallelism to efficiently access the flash memory chips 131_1-131_A, even if the control module 126_1/300 receives many commands within a short period.

In the scanning operation of the arbiter and DMA engine 440, the arbiter and DMA engine 440 will always detect the flash memory chips 131_1-131_A in sequence, that is each flash memory chip will only be detected once in a scan cycle. In another embodiment, the arbiter and DMA engine 440 may perform more detection operations for a specific flash memory chip within the scan cycle. For example, if the command queue 431_2 has a read command with a very high priority, the arbiter and DMA engine 440 will increase the detection rate of the flash memory chip 131_2 (i.e. the detection rate of the flash memory chip 131_2 is higher that the detection rate of the other flash memory chips), or the arbiter and DMA engine 440 can only detect the flash memory chip 131_2 until the read command with very high priority is executed.

Briefly summarized, in the memory controller of the present invention, by designing a plurality of control modules corresponding to a plurality of channels, respectively, and by designing a plurality of command queues corresponding to a plurality of planes/chips of the channel, respectively, the memory controller can efficiently process many commands within a short period, to overcome the command congestion issue in the conventional art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller configured to access a plurality of channels, wherein each of the channels comprises a plurality flash memory chips, and the memory controller comprises:
    a flash translation layer circuit, configured to generate commands with corresponding physical addresses of at least one of the channels; and
    a plurality of control modules implemented by circuits, coupled to the flash translation layer circuit, wherein the control modules are connected to the plurality of channels, respectively, and each of the control modules operates independently to receive the corresponding command with the corresponding physical address from the flash translation layer circuit, to access the flash memory chips within the corresponding channels;
    wherein each of the control modules comprises:
        a plurality of command queues, wherein the plurality of command queues correspond to the plurality flash memory chips, respectively, and each of the command queues only stores the command having the physical address of the corresponding flash memory chip;
        an arbiter and direct memory access (DMA) engine circuit, coupled to the plurality of command queues, configured to scan the plurality of flash memory chips to determine states of the flash memory chips, for determining if executing the commands stored in the command queues;
        a first buffer circuit, configured to store first commands;
        a second buffer circuit, configured to store second commands; and
        a central processing processor circuit, coupled to the first buffer circuit and the second buffer circuit, configured to move the first commands and the second commands to the command queues according to physical addresses of the first commands and physical addresses of the second commands.

2. The memory controller of claim 1, wherein the arbiter and DMA engine circuit scans the flash memory chips by detecting the flash memory chips is sequence; and if the arbiter and DMA engine circuit detects that a specific flash memory chip is not busy, the arbiter and DMA engine circuit executes the command within a specific command queue corresponding to the specific flash memory chip, and the arbiter and DMA engine circuit immediately detect a next flash memory chip without considering a process of the specific flash memory chip.

3. The memory controller of claim 1, wherein the arbiter and DMA engine circuit scans the flash memory chips by detecting the flash memory chips, and a detection rate of each of the flash memory chips is determined according to a priority of the command(s) stored in the corresponding command buffer.

4. The memory controller of claim 1, wherein the first commands are write commands, and the second commands are read commands.

5. The memory controller of claim 1, wherein the first commands have higher priority than the second commands.

6. The memory controller of claim 5, wherein the first commands comprise read commands from a host external to the memory controller, and the second commands comprise write commands or self-generated commands.

7. A server, comprising:
- a network module circuit, configured to connect client device(s) via network;
- a processor circuit, configured to control operations of the server;
- a plurality of channels, wherein each of the channels comprises a plurality flash memory chips; and
- a memory controller, coupled between the processor and the plurality of channels, wherein the memory controller comprises:
  - a flash translation layer circuit, configured to generate commands with corresponding physical addresses of at least one of the channels; and
  - a plurality of control modules implemented by circuits, coupled to the flash translation layer circuit, wherein the control modules are connected to the plurality of channels, respectively, and each of the control modules operates independently to receive the corresponding command with the corresponding physical address from the flash translation layer, to access the flash memory chips within the corresponding channels;

wherein each of the control modules comprises:
- a plurality of command queues, wherein the plurality of command queues correspond to the plurality flash memory chips, respectively, and each of the command queues only stores the command having the physical address of the corresponding flash memory chip;
- an arbiter and direct memory access (DMA) engine circuit, coupled to the plurality of command queues, configured to scan the plurality of flash memory chips to determine states of the flash memory chips, for determining if executing the commands stored in the command queues;
- a first buffer circuit, configured to store first commands;
- a second buffer circuit, configured to store second commands; and
- a central processing processor circuit, coupled to the first buffer circuit and the second buffer circuit, configured to move the first commands and the second commands to the command queues according to physical addresses of the first commands and physical addresses of the second commands.

8. The server of claim 7, wherein the arbiter and DMA engine circuit scans the flash memory chips by detecting the flash memory chips is sequence; and if the arbiter and DMA engine circuit detects that a specific flash memory chip is not busy, the arbiter and DMA engine circuit executes the command within a specific command queue corresponding to the specific flash memory chip, and the arbiter and DMA engine circuit immediately detect a next flash memory chip without considering a process of the specific flash memory chip.

9. The server of claim 7, wherein the arbiter and DMA engine circuit scans the flash memory chips by detecting the flash memory chips, and a detection rate of each of the flash memory chips is determined according to a priority of the command(s) stored in the corresponding command buffer.

10. The server of claim 7, wherein the first commands are write commands, and the second commands are read commands.

11. The server of claim 7, wherein the first commands have higher priority than the second commands.

12. The server of claim 11, wherein the first commands comprise read commands from a host external to the memory controller, and the second commands comprise write commands or self-generated commands.

* * * * *